Oct. 31, 1967  D. L. ALLEN  3,350,136
SAFETY RETAINING BELT FOR SHOPPING CARTS
Filed March 2, 1966  2 Sheets-Sheet 1

INVENTOR
DAVID L. ALLEN
BY
ATTORNEY

Oct. 31, 1967  D. L. ALLEN  3,350,136
SAFETY RETAINING BELT FOR SHOPPING CARTS
Filed March 2, 1966  2 Sheets-Sheet 2

INVENTOR
DAVID L. ALLEN
BY Claude A. Patalidis
ATTORNEY

United States Patent Office 3,350,136
Patented Oct. 31, 1967

3,350,136
SAFETY RETAINING BELT FOR
SHOPPING CARTS
David L. Allen, Livonia, Mich., assignor of twenty-five percent to Patricia Daniels and twenty-five percent to Gail Stoll, both of Livonia, Mich.
Filed Mar. 2, 1966, Ser. No. 533,131
3 Claims. (Cl. 297—388)

This invention relates to shopping carts of the type employed by patrons of markets to collect and transport a selection of goods, and more particularly to a safety belt useful for retaining children securely in the seats provided for them in such shopping carts.

An increasingly large percentage of the shopping carts used in supermarkets and other places are designed to provide a seat for infants or small children who accompany shoppers. These seats normally consist of a back rest and a horizontal seat member located adjacent to the top side of the upper basket of the shopping cart, adjacent to the handle, and a pair of apertures formed in the back of the basket which allow the child's legs to extend outwardly from the basket. Shopping carts incorporating such seats are very popular as those customers accompanied by small children find them a convenient way to transport the child and maintain him in a controllable position, and the customers who are not accompanied by children may use the seat compartment for the retention of small or fragile articles.

A problem is created in the use of such carts because the more mobile children often attempt to crawl out of the seats and thereby place themselves in a dangerous position with respect to both their persons and the merchandise displays in the market. The present invention therefore contemplates a safety retaining belt intended to be incorporated in shopping carts of the type having children's seats for the purpose of securely, but gently, retaining the child in the seat and preventing him for accidentally or intentionally leaving the seat. In order for such a seat belt to be commercially successful it must be low in cost, easy to install in new or existing carts, simple to operate, and unobstrusive when not in use. The present invention contemplates such a belt which meets all of these requirements.

As disclosed in the following detailed description of an example of a preferred embodiment of the invention, the belt is of the self-retracting type so as to assume a compact and relatively neat position when not in use, and to automatically adjust to the size of a wide range of occupants when in use. The preferred embodiment of the belt is housed in a substantially cylindrical enclosure or housing which is adapted to be secured to one side of the basket member which serves as a back rest for the child. The end of the belt projecting through a vertically disposed slotted channel oriented toward the near side of the cart basket is adapted to be easily pulled from the housing, brought around the front of the back rest and the child, and snapped, by way of snap fastener or buckle, onto a structural member of the cart on the side opposite to the side at which the housing is attached in order to retain the child in the seat. The mechanism within the housing exerts a gentle pull on the belt so that the belt conforms to the size of the occupant. When the buckle is released, the belt is automatically retracted within the housing. The mechanism within the housing consists of a rotatable drum on which is attached the end of the belt, and which is biased in a direction that retracts the belt by causing it to wind around the drum under the action of a spiral spring having one end affixed to the housing and its other end affixed tangentially to the rotatable drum. The spring normally urges the drum to rotate in a direction that causes the belt to be retracted with only its buckle end extending from the slotted channel. When the belt is pulled, the belt unwinds from the drum against the torque exerted thereupon by the spiral spring.

After the belt has been disposed around the child's body with its snap or buckle end securely attached to a structural member of the cart, the orientation of the slotted channel away from the path of the belt causes the belt to curve around the outer edge of the channel and around part of the housing so as to give rise to a frictional inter-relation, between the belt surface on one hand, and the channel edge and the housing outer surface on the other hand, that tends to oppose further extension of the belt from the housing and any propensity for the belt to retract within the housing under the torque action exerted by the spiral spring upon the drum. But, as soon as the buckle end of the belt is unsnapped, the spring action automatically retracts the belt into the housing. This arrangement is low in cost, simple in construction and highly reliable in operation.

It is therefore seen to be the primary object of the present invention to provide a safety retaining and restraining belt assembly for children seated in shopping carts, including a housing disposed on one side of the back rest of the cart seat which carries the belt in a retracted position when not in use and which allows the belt end to be withdrawn from the housing into an operating position.

Another object is to provide such a seat belt assembly wherein the belt is retracted by a spring mechanism which exerts a rotating torque force upon a drum to which the belt is attached.

Another object is to provide such a seat belt assembly wherein the housing may be easily attached to existing shopping carts.

Other objects, advantages and applications of the present invention will be made apparent by the following detailed description of a preferred embodiment of the invention. The description refers to the accompanying drawings in which.

Figure 6:
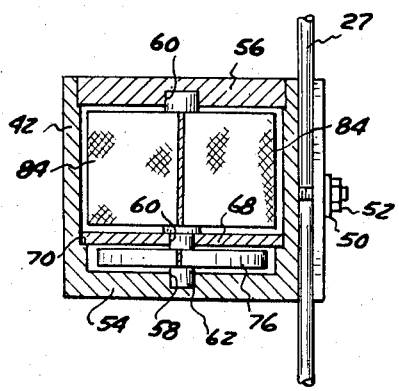
Figure 5:
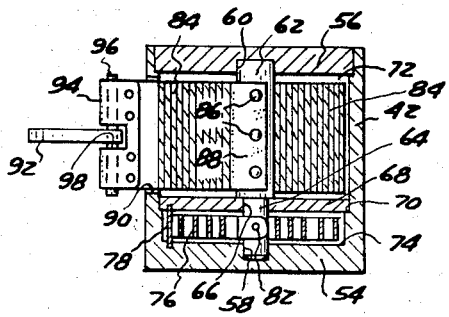
Figure 3:
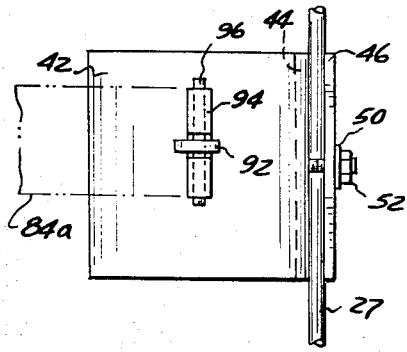
FIGURE 3 is a side elevation view of the seat belt retaining mechanism.
Figure 4:
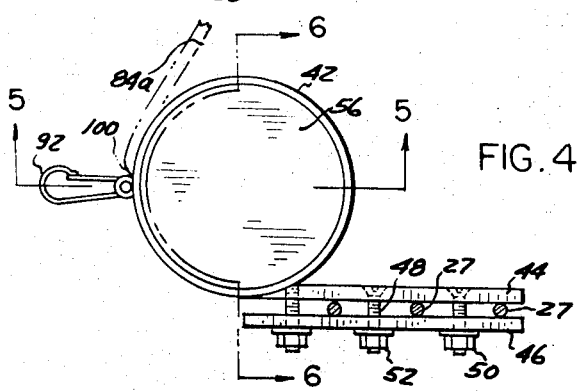
FIGURE 4 is a top plan view thereof.

FIGURE 5 is a sectional view through the seat belt mechanism taken along line 5—5 of FIGURES 3 and 4; and FIGURE 6 is another sectional view through the seat belt mechanism taken substantially along line 6—6 of FIGURE 4.

Figures 1, 2:
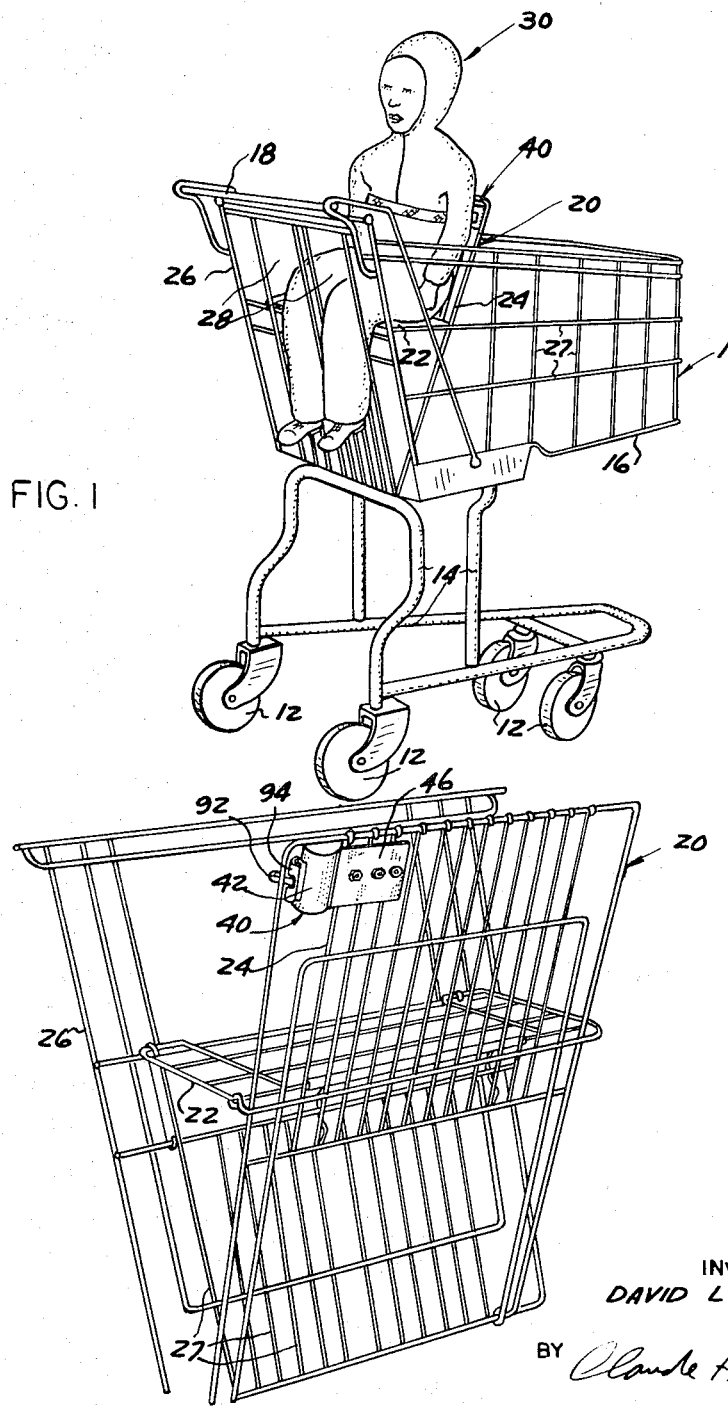
FIGURE 1 is a perspective view of a shopping cart having a child's seat, occupied by a child who is retained in a seat by a belt according to a preferred embodiment of the present invention.
FIGURE 2 is a detailed view of the child's seat section of the cart showing the preferred embodiment of the seat belt in a retracted position.

Referring to the drawings, an example of a preferred embodiment of the invention is applied to a shopping cart generally indicated at 10, FIGURE 1. The cart broadly consists of caster type wheels 12, a basket supporting structure 14, a basket proper 16, and a handle mechanism 18. Included at the upper side of the basket, adjacent to the handle structure 18, is a child's seat section, generally indicated at 20.

As detailed in FIGURE 2, the child's seat section 20 of the shopping cart 10 broadly consists of a horizontal seat member 22, a back rest member 24 which extends upwardly from what could be termed the forward side of the seat member and which is slightly inclined with respect to the vertical in the forward direction, and the rear member 26 of the cart also defining the rearward side of the seat member. Each of these members, and the cart basket proper 16, is formed of spaced wire members 27. The particular configuration of the seat and the structure of the members is not of importance to the present invention and will not be detailed in this description. It should be recognized that in its broader aspects the present invention is applicable to use with any form of seat member, including those not employed in shopping carts, but has particular merit when used in its narrower sense in combination with the seat of a shopping cart.

The rear member 26 of the basket 16, has a pair of spaces 28 formed directly forward of the seat. These spaces are adapted to pass the legs of a child occupying the seat. As shown in FIGURE 1, a child, generally indicated at 30 sits on the horizontal member 22 with his back resting on the vertically inclined member 24 and his legs passing through the apertures 28 in the rear member 26. The broad purpose of the present invention, as has been noted, is to restrain the child in this position and prevent him from either accidentally or intentionally leaving the position without first having the safety belt undone, either by the child or by the accompanying adult.

The belt assembly, generally indicated at 40, is housed within a substantially cylindrical casing or housing 42, provided with a mounting bracket 44 affixed along a generatrix of said housing by means such as bonding, soldering, welding or the like.

The belt assembly 40 is mounted on one side of the backrest 24 by way of the bracket 44 being disposed toward the front of the backrest, as seen in FIGURE 2, and the mounting plate 46 disposed on the back of the backrest. Any conventional means such as studs 48, washers 50 and wing nuts or ordinary nuts 52 may be used for clamping the mounting bracket in position with the wire members 27 disposed between the bracket and the plate, as shown particularly in FIGURES 3 and 4. The opposing faces or surfaces of bracket 44 and mounting plate 46 may be provided with laterally oriented linear grooves or indentations corresponding in spacing to the spacing of the wire members so as to provide a better grip for clamping thereupon.

As shown more clearly in FIGURES 5 and 6, the housing 42 is substantially cup shaped and preferably is formed with an integral lower end plate 54. The open upper portion of the housing 42 is normally obturated by means of a circular cover plate 56 press-fitted thereon or fastened by any other adequate means. The housing 42 and the end plate 56 may be made of any material such as a metal or alloy or a plastic. Furthermore, although preferably made, as shown, in a cylindrical shape, the housing 42 may obviously be of any convenient shape.

Lower end plate 54 is provided with a blind bore 58 having its axis substantially aligned with the axis of the cylindrical housing and end plate 56 is similarly provided with a blind bore 60 aligned with bore 58. Blind bores 54 and 58 define bearing elements for a spindle or drum member 62 supported between the end plates 54 and 56, each end of the drum being adapted to journal in each of bearings 58 and 60, respectively. It is to be noted that in the example of the invention shown in the drawings, drum 62 has a reduced diameter end 64 projecting through an aperture 66 centrally disposed in a disc-like wall member 68 substantially parallel to the end plates 54 and 56 of the housing. The edge of the bottom face of disc-like wall 68 engages a shoulder ridge 70 formed on the interior surface of the housing which is thus separated into two compartments designated respectively 72 and 74. It is evident that drum 62 may be provided with a constant diameter all along its length, although it is preferable to provide the portion of the drum around which the belt is wound when in a retracted position with a diameter sufficient to avoid causing undue flaring of the material constituting the belt.

In compartment 74, situated between disc-like wall 68 and end plate 54, there is a spiral spring member 76 having its outer end 78 attached fixedly to the housing, for example by being provided with an enlarged portion engaging partial grooves disposed in both the face of the end plate 54 and of the disc-like wall 68. The other end 80 of the spiral spring member is tangentially attached to the periphery of the spindle or drum 62 by means such as pin or rivet 82. The direction of the spiral spring 76 has been arbitrarily chosen so that when drum 62 is rotated in a clockwise direction, spring 76 is wound so as to exert a counter-clockwisely directed torque upon drum 62.

A flat flexible belt member 84, which may be made of any conventional webbing material such as cotton, nylon, and the like, has one end attached by means of fasteners such as rivets or screws 86 upon the periphery of drum 62, a plate 88 being preferably interposed between the screw or rivet heads and the surface of the belt. The belt is thus normally disposed in compartment 72 in a wound condition around drum 62 with the other end of the belt disposed through a slot-like channel 90 affording a passage to the belt to the exterior of housing 42, the longer side of the slot-like channel being preferably substantially parallel to the axis of drum 62. On the end of the belt 84, thus projecting to the outside of the housing, is attached a snap or buckle 92 by any conventional means such as a plate member 94 riveted on the end of the belt and provided with a rod-like member 96 adapted to be clamped in the bracket. The rod-like member 96 holds the snap or buckle 92 by passing through a looped end of the snap or buckle which is disposed through a cut-out portion 98 of the bracket 94. In operation, the safety belt according to the shown example of the invention is withdrawn by being pulled from the housing thus rotating drum 62 which causes spiral spring 76 to be wound. The withdrawn portion of the belt is passed around the body of the occupant 30 of the seat of the cart 10, as shown on FIGURE 1, and the buckle 92 is snapped upon any appropriate structural member of the basket or cart on the side opposite to the one on which the housing 42 is mounted. When the belt is thus disposed around the body of the occupant of the seat, because of the orientation of the slot-like channel 90 away from the path of the belt, the belt is caused to occupy the position indicated in phantom on FIGURES 3 and 4, and as identified by numeral 84a, thus causing a portion of the surface of the belt to engage the outer surface of the housing 42 and to curve substantially abruptly as shown at 100 on FIGURE 4, where it projects from the slot-like channel 90 and bends around the edge thereof. In this manner, the belt is somewhat restrained from moving in either direction, in view of the frictional engagement between the belt surface on one hand, and the channel edge and housing surface on the other hand, with the result that the tension on the belt caused by the action of spiral spring 76 is substantially relieved and that the belt is substantially prevented from further extending through normal moderate pull exerted upon the end thereof.

When it is desired to remove the occupant from the seat, the buckle 92 is detached by being unsnapped from the structural member upon which it was attached and the belt 84 is allowed to retract automatically into the housing 43 under the effect of the torque developed by the unwinding of spiral spring 76 causing the drum 64 to rotate in a counter-clockwise direction, thus in turn causing the belt to wind itself around the drum.

It should be appreciated that the direction of rotation of drum 62 has been arbitrarily chosen and could as well be chosen as being in the opposite direction. It should be also appreciated that although FIGURES 3 and 4 show the slot-like channel 90 affording passage to the belt to the exterior of the housing as being oriented substantially 45 degrees from the position to which the bracket member is attached to the outside of the housing 42, the channel could be oriented in any appropriate direction as long as its orientation is substantially away from the normal path of the belt when passed around the body of the seat occupant, so as to preferably cause a frictional engagement between the surface of the belt and the outer surface of the housing as explained hereinbefore.

It is obvious that the invention could be constructed so as to have an appearance substantially different from the example shown herein for illustrative purposes only and that many variations, additions and omissions of elements fall within the preview of the claims as enunciated hereinafter.

What is claimed as new is:

1. A retractable seat belt assembly for the seat of a shopping cart having a seat member and a back rest comprising:
   - a substantially cylindrical housing affixed with its axis substantially vertical to one side of the back rest;
   - a bracket dependent from said housing and provided with clamping means for attaching to a structural member of said shopping cart;
   - a drum member in said housing adapted to journal in said housing, said drum member being disposed in a compartment in said housing;
   - a flat flexible belt member having one end attached to the periphery of said drum member;
   - a slot-like channel in said housing affording passage for the belt member to the outside of said housing;
   - a snap buckle fixedly attached to the other end of said belt member and adapted for engagement with a structural member of said shopping cart; and
   - a spiral spring in another compartment in said housing and having one end attached to said housing and another end attached tangentially to said drum member so as to rotationally urge said drum member in the direction that retracts said belt member by winding around the periphery of said drum member.

2. The retractable seat belt assembly of claim 1 wherein the slot-like channel is oriented in a direction away from the normal orientation of said belt member when passed around the body of an occupant of the seat so as to cause frictional engagement of one side of the belt member with a side of said slot-like channel and a portion of the outer surface of said housing.

3. A retractable seat belt for restraining a child in a seat of a shopping cart having a substantially horizontal seat member and a back rest, said belt comprising:
   - a housing;
   - means dependent from said housing for affixing said housing to one side of said backrest by clamping to a structural member of said shopping cart;
   - an elongated flexible belt member having means on one end for attaching to a structural member of said shopping cart;
   - a drum member journalled in said housing and having the other end of said belt member affixed to the periphery thereof;
   - a spring member exerting a torque upon said drum member for normally urging said drum member for rotation for causing said belt member to be retracted by winding around said drum member; and
   - wherein the end of the belt member having means for attaching to a structural member of said shopping cart normally projects through a slot-like channel in said housing deviating substantially from the belt path when said belt is passed over an occupant of the seat with the means on the end of said belt attached to a structural member of the cart, so as to cause frictional engagement of the side of said belt member with the side of said channel.

References Cited
UNITED STATES PATENTS

| | | | |
|---|---|---|---|
| 2,861,627 | 11/1958 | Smith | 297—388 |
| 2,878,981 | 3/1959 | Guido | 297—385 X |
| 2,905,231 | 9/1959 | Olson | 297—388 |
| 3,042,032 | 7/1962 | Vogel | 297—385 X |
| 3,171,688 | 3/1965 | Nicholas | 297—388 |
| 3,174,704 | 3/1965 | Replogle | 297—388 |
| 3,205,004 | 9/1965 | Spouge | 297—388 |
| 3,227,489 | 1/1966 | Stubblefield | 297—388 |

CASMIR A. NUNBERG, *Primary Examiner.*